United States Patent
Shen et al.

(10) Patent No.: US 10,402,940 B2
(45) Date of Patent: Sep. 3, 2019

(54) METHOD AND SYSTEM FOR ACCELERATING VIDEO PREVIEW DIGITAL CAMERA

(71) Applicant: Pathway Innovations and Technologies, Inc., San Diego, CA (US)

(72) Inventors: Ji Shen, San Diego, CA (US); Bruce Barnes, Escondido, CA (US); Hamid Kharrati, La Jolla, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 0 days.

(21) Appl. No.: 14/382,181

(22) PCT Filed: Oct. 30, 2013

(86) PCT No.: PCT/US2013/067444
§ 371 (c)(1),
(2) Date: Aug. 29, 2014

(87) PCT Pub. No.: WO2014/074361
PCT Pub. Date: May 15, 2014

(65) Prior Publication Data
US 2015/0242994 A1  Aug. 27, 2015

Related U.S. Application Data

(63) Continuation of application No. 13/506,208, filed on Apr. 4, 2012, now Pat. No. 8,508,751, which is a
(Continued)

(51) Int. Cl.
*G06T 3/40* (2006.01)
*H04N 1/00* (2006.01)
(Continued)

(52) U.S. Cl.
CPC .............. *G06T 3/40* (2013.01); *G06F 3/14* (2013.01); *H04N 1/00204* (2013.01);
(Continued)

(58) Field of Classification Search
USPC ......................................................... 345/428
See application file for complete search history.

(56) References Cited

U.S. PATENT DOCUMENTS 5,894,529 A     4/1999  Ting
7,143,432 B1 *  11/2006 Brooks .......... H04N 21/234363
                                          370/437

(Continued)

FOREIGN PATENT DOCUMENTS

JP      2005191949 A    7/2005

OTHER PUBLICATIONS

International Search Report dated Mar. 25, 2011, for PCT/US2011/022549, filed Jan. 26, 2011.
(Continued)

*Primary Examiner* — Kimbinh T Nguyen
(74) *Attorney, Agent, or Firm* — Trevor Coddington; San Diego IP Law Group LLP

(57) ABSTRACT

A method for processing images in an imaging device includes the steps of using real time scalar software (RTSS) for: receiving scalar input data (SID) from video preview application software (VPAS) within a host computer; and performing scaling and cropping operations within the imaging device on raw image frame data to create a scaled down frame (SDF) within the imaging device. As a result, images of high resolution can be transmitted efficiently with significantly reduced amounts of data over the data links, and achieve a high number of frames per second.

9 Claims, 6 Drawing Sheets

Figure 1:
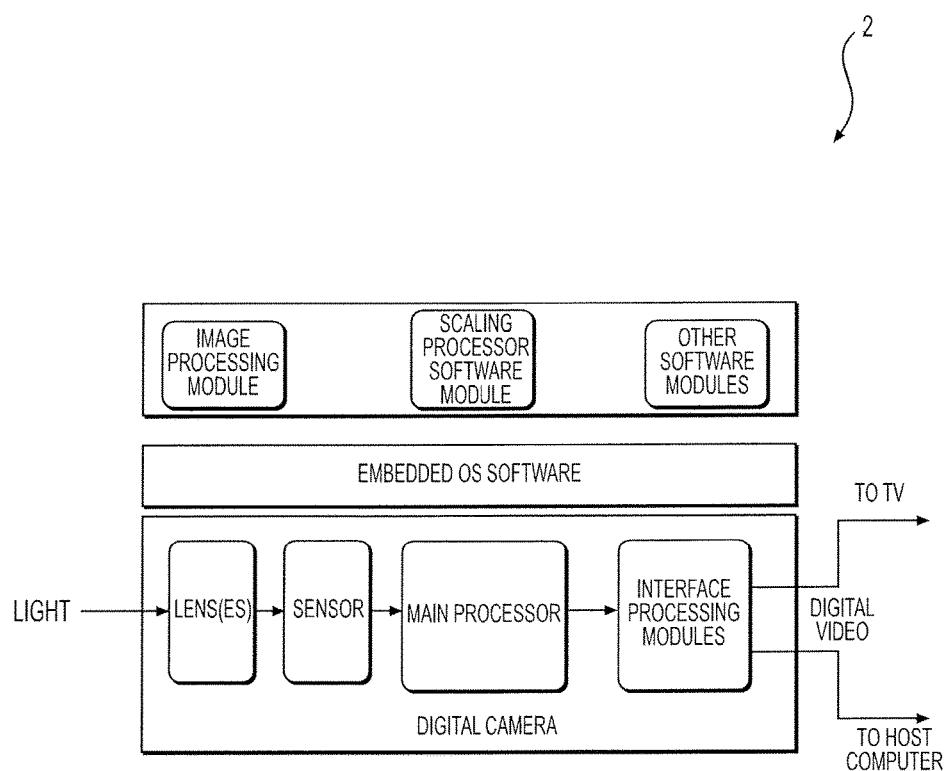

Related U.S. Application Data continuation of application No. PCT/US2011/022549, filed on Jan. 26, 2011.

(60) Provisional application No. 61/722,966, filed on Nov. 6, 2012, provisional application No. 61/298,912, filed on Jan. 28, 2012.

(51) Int. Cl.
| | |
|---|---|
| *H04N 1/195* | (2006.01) |
| *H04N 1/393* | (2006.01) |
| *G06F 3/14* | (2006.01) |
| *H04N 5/341* | (2011.01) |
| *H04N 5/345* | (2011.01) |
| *H04N 5/232* | (2006.01) |

(52) U.S. Cl.
CPC ..... *H04N 1/00535* (2013.01); *H04N 1/00559* (2013.01); *H04N 1/19594* (2013.01); *H04N 1/393* (2013.01); *H04N 5/341* (2013.01); *H04N 5/3454* (2013.01); *H04N 5/23296* (2013.01); *H04N 2201/0041* (2013.01); *H04N 2201/0049* (2013.01); *H04N 2201/0436* (2013.01)

(56) References Cited

U.S. PATENT DOCUMENTS

| | | | | |
|---|---|---|---|---|
| 7,424,218 B2* | 9/2008 | Baudisch | ............... | G03B 13/02 348/218.1 |
| 8,549,571 B2* | 10/2013 | Loher | ................... | H04N 7/183 348/211.3 |
| 8,587,653 B1* | 11/2013 | Vidunas | ................ | H04N 5/247 348/143 |
| 8,639,812 B2* | 1/2014 | Leibow | .................. | G06F 3/023 345/168 |
| 2002/0126751 A1* | 9/2002 | Scheurich | ............. | H04N 5/232 375/240.02 |
| 2004/0205546 A1 | 10/2004 | Blumberg | | |
| 2005/0177783 A1 | 8/2005 | Agrawala et al. | | |
| 2006/0012830 A1* | 1/2006 | Aiso | ...................... | G06T 3/4053 358/3.27 |
| 2006/0277393 A1 | 12/2006 | Wu et al. | | |
| 2006/0290792 A1 | 12/2006 | Nikkanen et al. | | |
| 2007/0139400 A1* | 6/2007 | Neuman | ............... | H04N 7/0122 345/204 |
| 2007/0174489 A1 | 7/2007 | Iwabuchi | | |
| 2009/0033752 A1* | 2/2009 | Bodnar | .............. | H04N 5/23229 348/211.3 |
| 2009/0067724 A1 | 3/2009 | Hirohata | | |

OTHER PUBLICATIONS

International Search Report dated Mar. 6, 2014, for PCT/US2013/067444, filed Oct. 30, 2013.

\* cited by examiner

METHOD AND SYSTEM FOR ACCELERATING VIDEO PREVIEW DIGITAL CAMERA This application claims benefit under 35 U.S.C.§ 119(e) as a non-provisional application of provisional patent application Ser. No. 61/722,966 filed on Nov. 6, 2012, the content of which is hereby incorporated by reference in its entirety. This application also claims benefit under 35 U.S.C. § 120 as a continuation of patent application Ser. No. 13/506,208 filed on Apr. 4, 2012, which claims benefit under 35 U.S.C.§ 119(e) as a non-provisional application of provisional patent application Ser. No. 61/298,912 filed on Jan. 28, 2010, the content of each of which is hereby incorporated by reference in its entirety.

FIELD

The following subject matter relates to the general field of camera imaging.

BACKGROUND

Document cameras and other digital cameras increasingly have higher resolution digital imaging sensors, ranging from 2 MPixel, 5 MPixel, 10 MPixel, to 30 MPixel and even 40 MPixel, and will have even higher resolutions in the future. When a live preview of the video feed from these cameras is desired to be shown on a display or a host computer, several factors significantly limit the video display speed, (often referred to as the "smoothness" of the video) measured in frames per second (fps) of the host computer.

With reference to FIG. 1, a document camera 2 or other digital camera has been composed of a system of embedded electronics which include CMOS or CCD Sensors working in conjunction with Digital Signal Processing (DSP) processors, field programmable gate arrays (FPGA) processors, or ARM processors. Cameras based on these processors are capable of sending out high definition (HD) video at very high frame rates, such as 1080P HD video at sixty frames per second. However, 1080P, which is today's highest display resolution on consumer oriented HD TV's, is only roughly 2 MPixel in resolution, while sensor resolution is going far beyond to 10× or even 20× the 1080P resolution, and ever increasing. So video displays on HDTV screens can often deliver 60 fps but are unable to take full advantage of the camera sensor's high resolution.

Live video feed from a digital camera transmitted to a host computer, normally requires a USB 2.0 or USB 3.0 connector, and can deliver full frame images with the maximum sensor resolution; however, the live video feed often suffers from the limited bandwidth of USB channels, which results in very low video frame rates.

A host computer's display screen is most likely to have less resolution than the imaging sensor. In the past, a digital camera sent images directly to a host computer at whatever resolution the digital camera received the images from the digital camera's sensor outputs. The previous method jams up the data link easily, and causes low frame rates when displaying video images on the host computer's monitor.

Scalar software is currently present on digital camera devices. Images are scaled to a set of predefined resolutions on the camera device. Image output is one directional to the host computer or other display terminals. The "predefined" resolution sets severely limit the dexterity of these systems. Moreover, the predefined resolutions may not maximize the resolution of the display due to mismatched resolution values of the predefined resolution versus the display resolution of the host computer's display terminal.

Further, large sized video frame data must be transferred across limited bandwidth connections between the digital imaging device and the host computer. When frame resolution is high, this results in unacceptably low frame rate transfer for visual display on the host computer. To overcome such USB bandwidth limitations, image compression using Motion JPEG or H.264 encoding techniques is often employed. However, image compression often results in loss of image clarity due to the nature of most compression algorithms. Encoding of video on the camera and decoding on the host computer can also require significant processing overhead, which increases cost and causes low frame rates while displaying.

SUMMARY

In the case of visual presentation, it is highly desirable to display uncompressed video with the highest resolution possible, while maintaining a high frame rate, so that any movement of objects within a video image do not exhibit jerkiness, choppiness or stutter in the video. Such a desirable video characteristic is highly challenging to practitioners in the art.

One of the advantages of the inventive subject matter is that transmission of high quality video images without loss of video quality requires significantly less data to be transmitted through a narrow data pipe because the host computer receives only those pixels that will be visible on the host computer's display. The imaging device accomplishes this by receiving real time input from the host computer in between each frame and dynamically calculating each frame to forward only the pixels needed by the host computer to achieve the least transmission delay over data links so that high resolution images can be viewed in real time on a host monitor with smooth motion. For example, "Windows" on desktops, i.e. on-screen images of applications running on a processor, are often of a smaller size than the full screen. For an image that is minimized from a full screen image to a window that takes only a portion of the monitor's screen, less than all available pixels can be used. In a reduced sized window appearing in a monitor, the image appearing in the window needs the amount of pixels used by the window, i.e., a window one tenth the size of the screen will use one tenth the total number of available pixels.

Today, the most common high resolution display monitors for PC's or Mac's have less than three megapixels, with two megapixel resolution monitors being the overwhelming majority. The latest model of an iMac® computer has 5 MPixels using Apple's Retina Display technology. Five megapixels is still relatively rare. Since there are fewer pixels on the host computer's monitor in most cases, even though the desire is to display video at the sensor's maximum resolution, it is basically not necessary to transfer every frame of video at the sensor's full resolution. Instead, a scaled or cropped frame can deliver the same visual clarity at a fraction of the total bandwidth required.

The disclosed method of transferring images between a digital imaging device and a host computer includes the steps of transferring image data between a digital imaging device and a host computer at a predetermined frame rate; and receiving video frames at the host computer from the digital camera, the frames having been scaled or cropped within the digital imaging device before receipt thereof by the host computer, and executing commands to display the video frames in the host computer's video display window.

The present system uses a unique lossless data reduction technique. The system includes a real time interactive/adaptive scalar (RTS), which runs in a digital imaging device. It takes input from a host computer once connected via USB 3.0 or USB 2.0 high speed interface (or any other high speed data link) and adapts the output of a digital camera to the host computer's capability for every video frame before it is transmitted to the computer and rendered. Input parameters include: current computer monitor's screen resolution/size capability in pixels, current window size, current zoom factor, panning offset values, and other values.

The RTS performs scaling or cropping on raw image frame data acquired from a high resolution sensor of the digital imaging device for each frame. More enhanced data reduction of the scaled frames can be optionally performed for USB 2.0 connections due to the highly limited bandwidth on such connections. Application software running on the host computer coordinates rendering of the scaled/processed image frame in conjunction with the host operating system (OS), CPU, graphics processing unit (GPU), and Graphics Card.

The host computer is surveyed for graphical display resolution in pixel sizes. Dimension data for the host computer's video display window is collected. And scaling input data (SID) is sent from the host computer to the digital imaging device. The SID includes display dimensions, window dimensions, a scaling factor, and panning offset data for the digital camera. Digital images are transferred with resolution not exceeding a maximum resolution of the host computer's video display window, in uncompressed or compressed format.

Digital images are transferred over a data link from the digital imaging device to the host computer via one or a combination of a USB 2.0 connection, a USB 3.0 connection or a limited transmission bandwidth connection. Use of compression techniques in this system is possible but not required. Data reduction is sufficient to accomplish the objective of this system without using compression techniques.

BRIEF DESCRIPTION OF THE SEVERAL DRAWINGS

Figure 2:
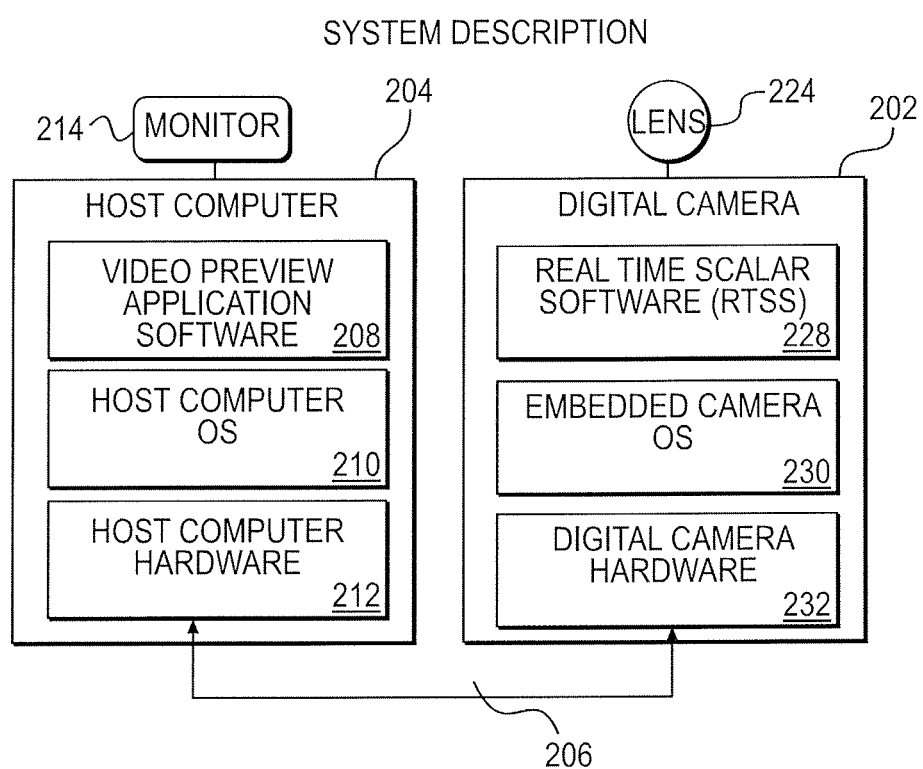
Figure 3:
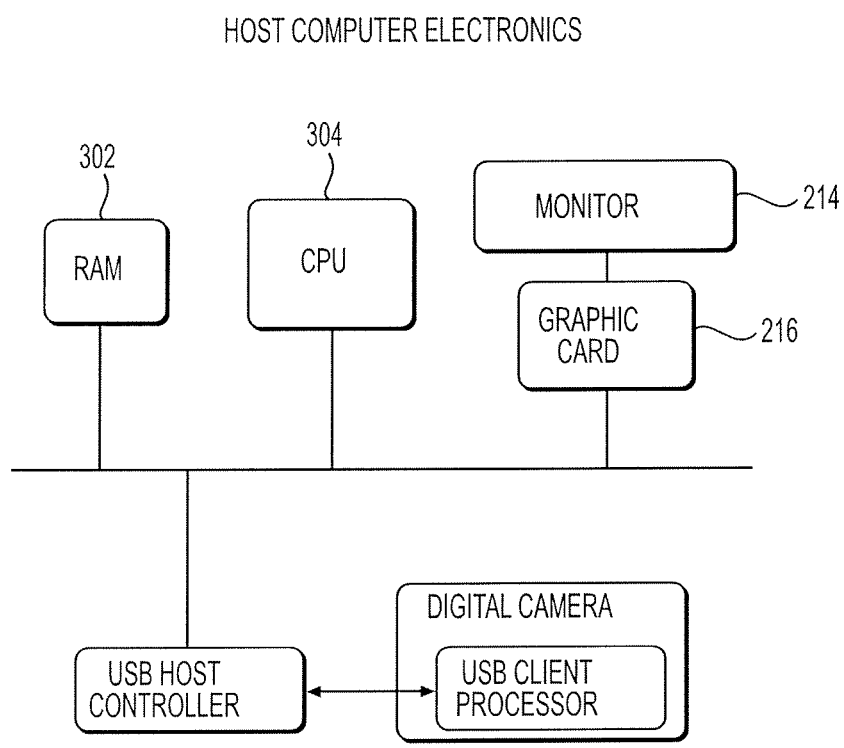
Figure 4:
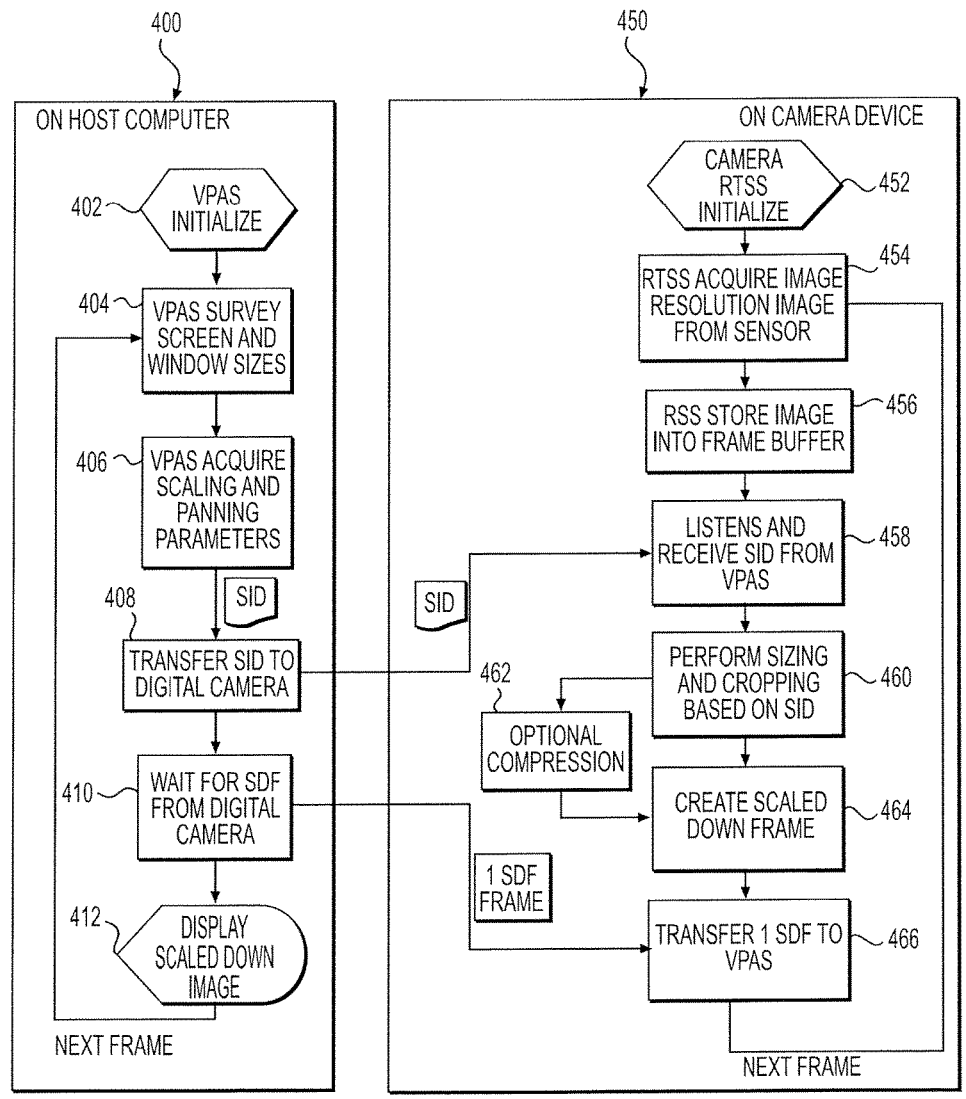
Figure 5A:
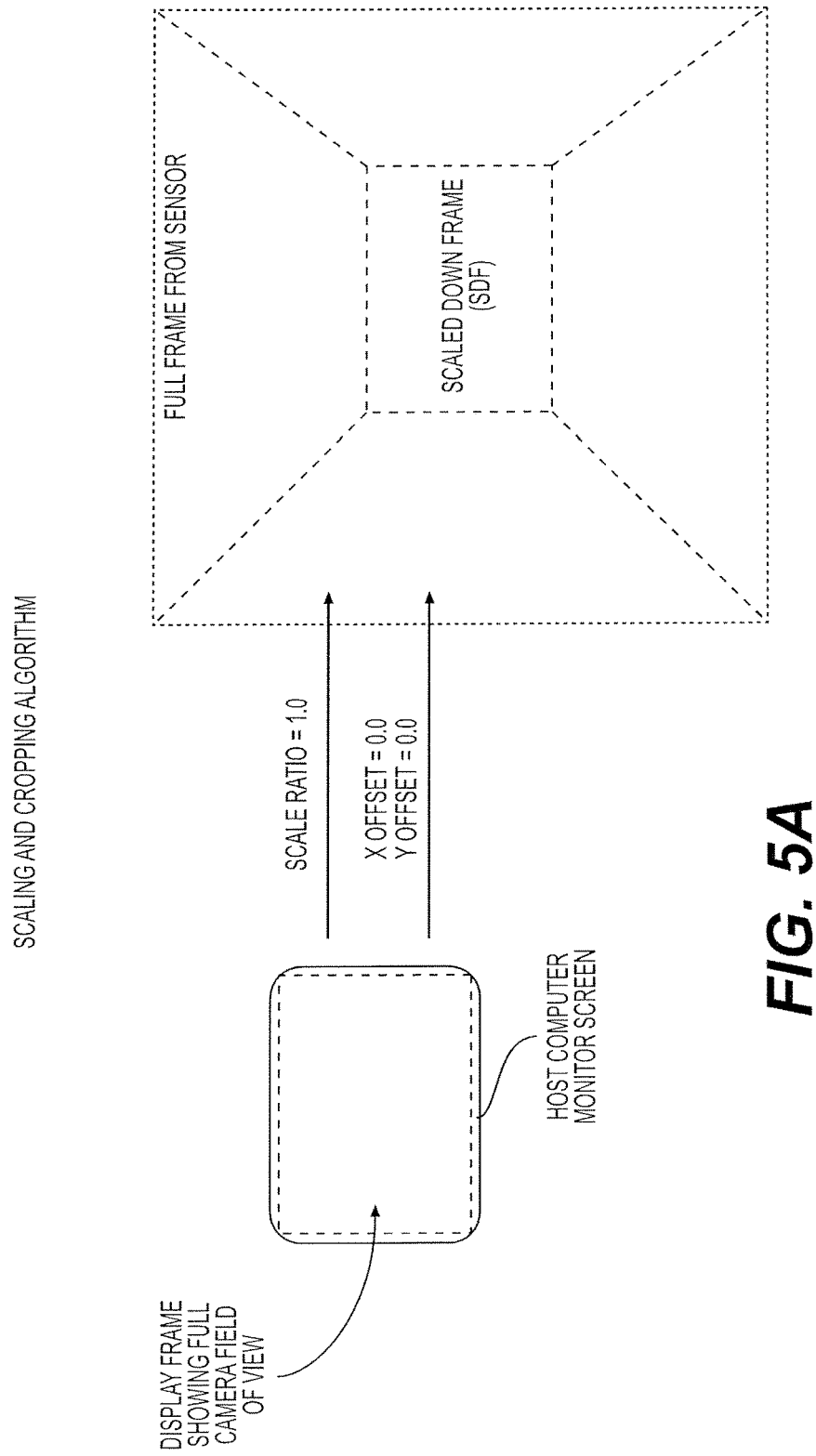
Figure 5B:
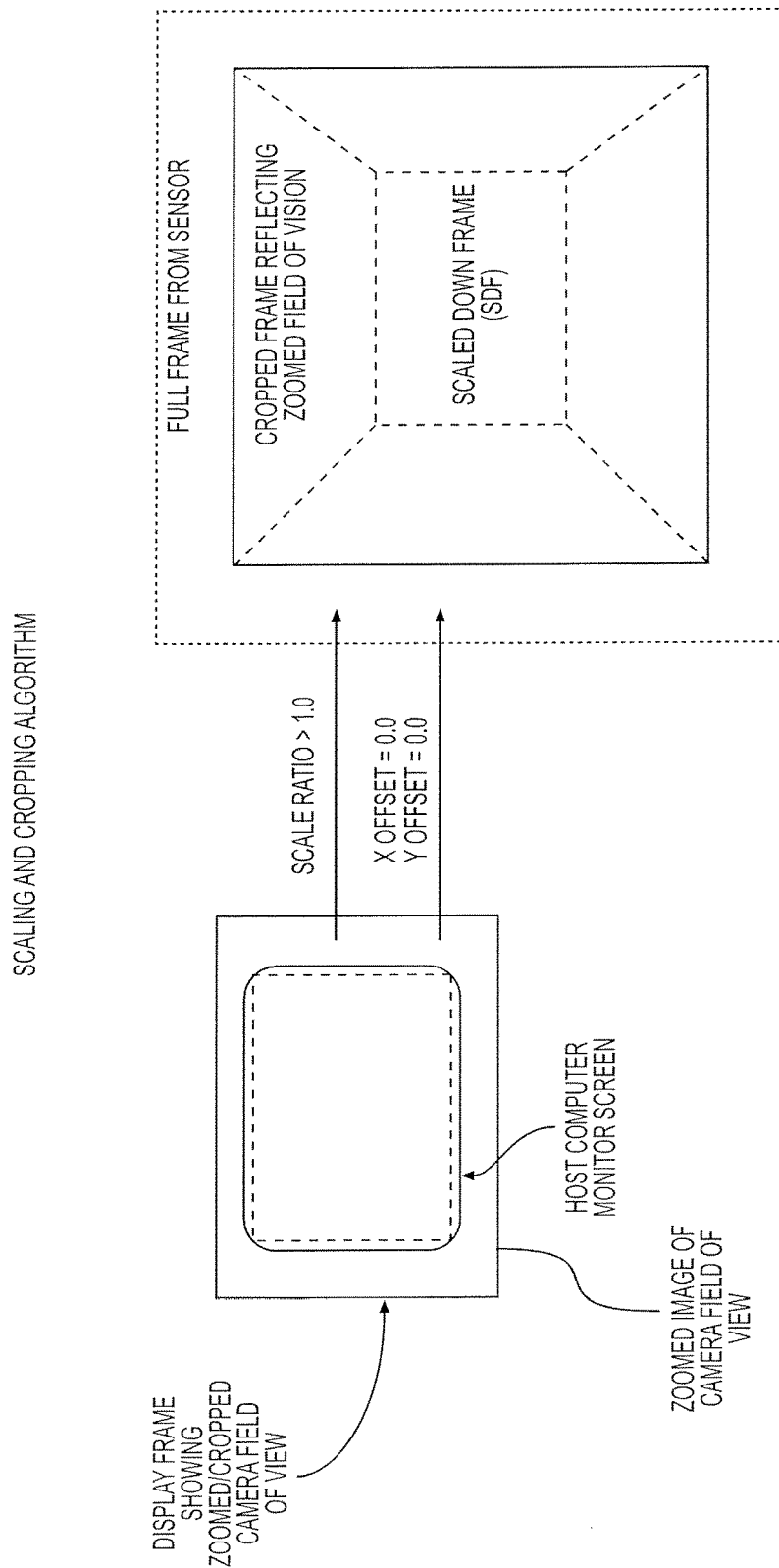

FIG. 1 shows a prior art method of data transmission;
FIG. 2 shows a system using the inventive method;
FIG. 3 shows the electronics of the host computer;
FIG. 4 is a flow chart showing steps performed in the inventive method;
FIG. 5*a* is an example of scaling a frame in a camera device; and
FIG. 5*b* is an example of a cropped frame in a camera device.

DETAILED DESCRIPTION

A USB 3.0 connection can enable transmission of 320 MB/s. Transmission of ten megapixel image frames takes about 30 MB/frame of data. Therefore, 10 fps over USB 3.0 is possible. USB 2.0 has a practical throughput of 35 MB/s, which means it can send about 1 fps of 10 MP, or 2.5 fps for 5 MP. The present subject matter achieves 10 MP at close to 30 fps, uncompressed. Compressing the video before sending over the connection allows an even higher frame transfer rate when transferred over USB 3.0. However, avoiding compression is sometimes preferable to preserve quality of the image. If images are sent over USB 2.0, then the images can be compressed to achieve 2 MP at 30 fps. Without compression, however, sending 2 MP at only 6 fps is possible with a USB 2.0 connection.

With reference to FIG. 2, the present system is a real time interactive/adaptive scalar (RTS) that runs in a camera device 202 (throughout this document digital imaging device and camera device are synonymous). The system receives input parameters from a host computer 204 once connected via USB 3.0 or USB 2.0 high speed interface 206. Input parameters include: a host computer monitor's screen resolution/size in pixels, a host computer's monitor window size, current zoom factor, panning offset values, and other values. The host computer 204 is connected to a monitor 214 or other display means and contains a processor (not shown) as a part of its hardware 212 running video preview application software (VPAS) 208 and an operating system 210. VPAS is not necessary and is only shown in this embodiment as an example of the dexterity of the inventive system.

Host computer electronics are shown in FIG. 3. The host computer 204 includes a random access memory 302, a central processing unit 304, monitor 214 and a GPU card. The camera device 202 contains a lens 224, a processor (not shown) within the camera's hardware 232 running real time scalar software, and a camera device operating system 230.

None of the embodiments disclosed herein is limited to a computer. The present system can operate on a tablet, a smartphone and any other device capable of receiving and displaying images from an imagining device. Typically, the limiting data transfer characteristic described above is present when an external imaging device is attached to a tablet or smartphone as a peripheral via a USB connection. However, it is also likely that a tablet or smartphone has an integrated imaging device. In such a case, a person having ordinary skill in the art would recognize that is possible that no USB connection would be present. Therefore, the limiting data transfer characteristic presented by a USB connection would not be present. Presentation speed would only be limited by the tablet or smart phone processor. Images received and stored in a buffer would be cropped or scaled based on the display characteristics of the tablet or smartphone.

With reference to FIG. 4, the method of operation within a host computer device 400 is depicted. At step 402, video preview application software within the host computer is initialized. In some embodiments, step 402 is optional as the video preview application software does not significantly influence the operation of the inventive system. At step 404, the VPAS surveys the screen and window sizes of the monitor 214 and stores the same in random access memory 302 for later reference by the digital camera device. At step 406, the VPAS acquires scaling and panning parameters in preparation for creating scaling input data (SID). With panning, for example, the VPAS establishes a point of reference in the image frame and determines how far in an x-y coordinate system a user has requested that an image be moved (the request being supplied via mouse, keypad or other means). The portion of the image that would no longer be visible on screen is cropped to reduce the amount of pixels being sent over the data link. At step 408, the VPAS sends that request in the form of SID, containing an offset measurement, to the digital camera so that an offset image (i.e., a panned image) is returned to the host computer from the digital camera. The SID is created having instructions for the digital camera device. The host computer then waits at step 410 for a single panned frame to be transferred from the digital camera. With scaling, the digital camera, in response to a scaling request, will crop the outer edges of the image and send that cropped image to the digital camera. At step 412, the scaled down frame image is displayed on the host computer's screen.

Any portion of the complete set of pixels of an image from a digital camera will always be available to the host computer in successive frames. The host computer is only limited in that it would not be able to receive all of the pixels of a digital camera in a single frame. As such, there are a plethora of on screen viewing options available. For example, any section of an image can be zoomed in on to view very small details of an image on a host computer's display screen. The host computer will only receive those portions of the image that are visible on screen or of most interest to the user. Zooming in on an image will cause the digital camera to ignore transmitting the outer edges of the images, thereby reducing the pixel size of the frame being sent. Similarly, zooming out from an image will eliminate the need for high detail of less important features within a frame. Several commonly known techniques or algorithms can be used to crop or scale an image such as discarding every other pixel, averaging every four pixels to form a new pixel, etc.

With further reference to FIG. 4, digital camera device 450 contains a processor running RTS software, which at step 452, is initialized. At step 454, high resolution images are acquired from the camera device's imaging sensor 224. At step 456, the images are stored in a frame buffer. At step 458, the camera device 450 listens for and receives SID information from the host computer device 400. "Listening" can be continuous, done at predetermined intervals, or done in response to a host computer event, for example, when a new host computer window is opened on screen. At step 460, the processor within the camera device 450 performs scaling and/or cropping based on the SID information that is received from the host computer device 400. At step 462, if desired, the image data is compressed; however, this step is not required. Compression typically depends on the type of data link between the camera and the host computer. Compression can be used for USB 2.0 but is unnecessary for USB 3.0. At step 464, a scaled down frame is created.

The RTS performs scaling or cropping on the raw image frame acquired from the high resolution sensor, down to a smaller frame, for each frame. Alternatively, a group of frames can be processed at once. The high resolution sensor can be stored and processed immediately before being sent to a host computer or it can be processed immediately upon being acquired in order to conserve storage space in the frame buffer and/or any associated storage device in the camera device 450. If a USB 2.0 connection is used and a slow fps rate is acceptable to a user in exchange for high quality images, compression would not be necessary. Therefore, whether to do compression at the digital camera side of the connection can be completely controlled by the user. Further, if the connection is slow, with a USB 2.0 connection, for example, and a high frame rate is desirable, then compression can be set automatically upon the host computer's detection of the slower USB 2.0 connection. Application software running on the host computer coordinates the subsequent rendering of the scaled/processed image frame in conjunction with the host OS, CPU, GPU, and Graphics Card on the host computer's monitor. A host computer monitor scaling factor and panning offset of the image can be applied via an interaction with host computer peripherals such as a mouse, a track pad and keyboard events.

A yet further method of transferring images between a digital imaging device and a host computer includes the steps of transferring uncompressed or compressed image data between a digital imaging device and a host computer at a predetermined frame rate; and receiving video frames at the host computer from the digital camera, the frames having been scaled or cropped within the digital imaging device before receipt thereof by the host computer, and executing commands to display the video frames in the host computer's video display window. Any compression, although unnecessary in this system, would occur in the camera.

A device using the present method can transfer images of very high resolution quality, e.g., 10 MP, at close to full motion (30 fps), over a (relatively slow) data link like USB 3.0, which is the fastest standard based data link today but can normally only transmit the same resolution (10 MP here) at less than 10 fps.

EXAMPLE 1

Assume a camera sensor's resolution is 10 MPixel. On a 1080P resolution computer monitor, which is equivalent to 2 MPixels on a screen having an aspect ratio of 16:9, a 10 Mpixel image of a single video frame acquired from the sensor, should be scaled down or cropped to be displayed on the smaller resolution screen. The needed scaling or cropping can be performed by the host computer or it can be performed by the camera device. If the scaling and cropping is performed on the host computer, the camera device can output at full resolution, while transferring a large amount of data across a bandwidth limited USB connection. However, this greatly reduces the transfer rate of the image frames.

If scaling and cropping is done in real time for every frame in the camera device before the images are transferred across the USB connection to the host computer, only a fraction of the total image size needs to be transferred. This results in a much reduced bandwidth requirement on the USB connection and increases video frame rate, while maintaining the same high resolution visual clarity. Scaling and cropping algorithms are well supported in FPGA's, DSP's, and some ARM processors. The required processing in the camera device does not cause discernible delays in transmitting video frames to the host computer.

EXAMPLE 2

A scaling algorithm is depicted in FIG. 5a. RTS software within the digital camera device performs a scaling down operation to create an SDF of the same size on the host computer monitor screen. When the host computer monitor screen size is smaller than the sensor full frame size, data volume transferred across USB connection is advantageously reduced.

EXAMPLE 3

A cropping and scaling algorithm is depicted in FIG. 5b. RTSS performs a cropping operation first, then scales down the cropped image to create an SDF. When the host computer monitor screen size is smaller than the cropped frame, bandwidth saving of transferring the SDF is achieved.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

We claim:

1. A method for transferring digital images from a digital imaging device to an external graphical display device comprising the steps of:
    acquiring image frames from an image sensor of the digital video imaging device;
    storing, in a frame buffer of the digital video imaging device, the acquired image frames; receiving scaling input data (SID) from a host computer via a USB client processor of the digital video imaging device, wherein the SID comprises scaling and panning parameters;
    scaling and cropping one or more of the stored image frames in the digital video imaging device, according to the SID;
    transferring from the digital video imaging device to the host computer the scaled and cropped image frames with a resolution not exceeding a maximum number of pixels visible to a user on the host computer's video display window; and
    transferring, in response to a request, the unscaled and uncropped stored image frames from the digital video imaging device to the host computer.

2. The method as recited in claim 1, wherein pixilation of a transferred digital image does not exceed pixilation of the video display window.

3. The method as recited in claim 1, further comprising interacting with peripherals to receive mouse, track pad, and keyboard events to determine the scaling and panning parameters.

4. The method as recited in claim 3, wherein the scaling and panning parameters comprise a scaling factor and a panning offset.

5. The method as recited in claim 1, wherein the USB client processor is compliant with USB2.0 or USB3.0.

6. The method as recited in claim 1, wherein the scaled and cropped image frames have a resolution that is equal to the host computer's video display window resolution.

7. A method of transferring video between a peripheral digital imaging device to a host computer comprising:
    connecting a digital imaging device to a host computer, wherein the digital imaging device is a peripheral device of the host computer, wherein the host computer has a video display window;
    receiving, at the digital imaging device, a target video resolution, wherein the target video resolution relates to the maximum video resolution viewable on the video display window;
    adjusting, at the digital imaging device, raw video data resolution to the target video resolution;
    receiving video frames at the host computer from the digital imaging device, the received video frames having been scaled or cropped before receipt by the host computer;
    executing commands to display the received video frames in the host computer's video display window at the target video resolution; and
    transferring, in response to a request, the unadjusted raw video data to the host computer.

8. The method of transferring video as recited in claim 7, wherein the video frames comprise video vector data, wherein the video vector data relates to displayable images, and wherein graphical representations of the video vector data are displayed in the host computer's video display window.

9. The method of transferring video as recited in claim 7, wherein the target video resolution is user definable, wherein the target video resolution does not exceed the maximum video resolution viewable on the video display window.

* * * * *